March 10, 1970  M. A. JOHNSON  3,500,303
SIGNAL GENERATOR FOR PRODUCING A SET OF SIGNALS OF COMMON
FREQUENCY AND ADJUSTABLE PHASE SLOPE
Filed March 14, 1968

INVENTOR:
MAJOR A. JOHNSON,
BY C. W. Baker
HIS ATTORNEY.

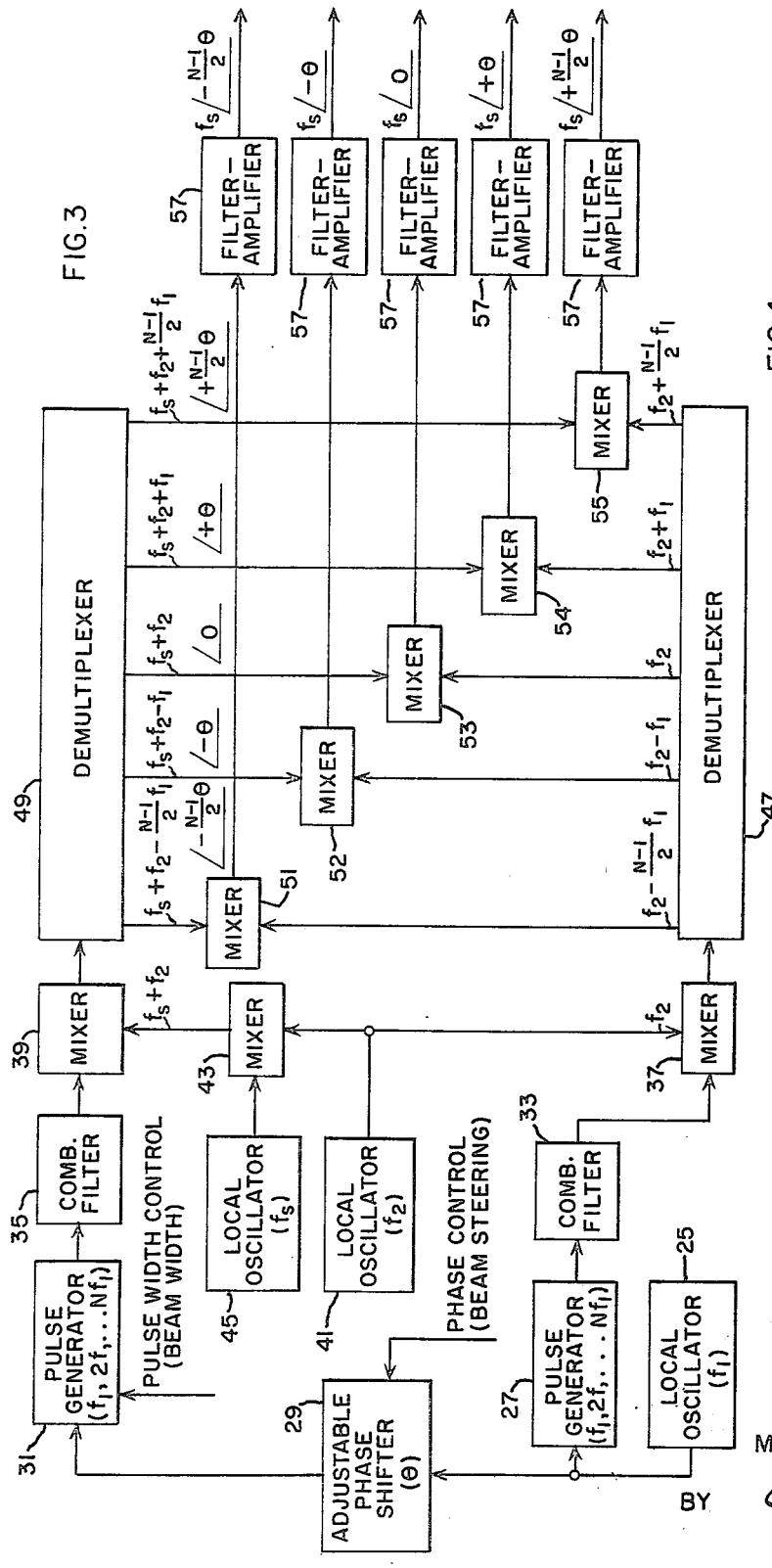

United States Patent Office 3,500,303
Patented Mar. 10, 1970

3,500,303
SIGNAL GENERATOR FOR PRODUCING A SET OF SIGNALS OF COMMON FREQUENCY AND ADJUSTABLE PHASE SLOPE
Major A. Johnson, Cazenovia, N.Y., assignor to General Electric Company, a corporation of New York
Filed Mar. 14, 1968, Ser. No. 713,217
Int. Cl. G01v 1/28
U.S. Cl. 340—6            6 Claims

ABSTRACT OF THE DISCLOSURE

This disclosure describes a signal generator for producing a family of signals of common frequency and of uniformly stepped phase progression with the rate of progression or phase slope adjustable. Signal sets of this character find application for control of beam direction in electronically steered array radiators of radar, sonar and communications systems, and in frequency selective filters of the kind tunable to scan through a band of frequencies. The signal generator as described comprises a reference harmonic spectrum generator and a steering harmonic spectrum generator provided with basic frequency inputs of common frequency value but with a phase difference made adjustable as by coupling one such input through an adjustable phase shifter. The output spectrum of one generator is offset in frequency with respect to the other by mixing with a steering frequency signal, and the two spectra then are combined by mixing their respective signals of the same harmonic order to produce a set of output signals all of the steering signal frequency and each displaced in phase from the next by a like phase difference of magnitude determined by adjustment of the phase shifter.

FIELD OF THE INVENTION

The invention herein described was made in the course of or under a contract, or subcontract thereunder, with the Department of the Air Force.

This invention relates generally to electrical signal generators and more specifically to such generators adapted to produce a family of output signals all of common frequency and of controlled amplitude and phase relation. Still more specifically, the invention relates to such generators capable of producing a set of signals of common frequency and of uniformly stepped phase progression with the magnitude of phase displacement between each two adjacent signals of the set being adjustable to thus control the phase slope across the set, and if desired with control also of relative amplitudes of the signals of the set.

Families of signals having the general character just described find application in phase steering of transmit and receive beams of electronically steered antenna arrays as used in microwave communications and radar systems, in other array radiators such as transmitting and receiving transducer arrays in sonar and underwater communications systems, and in frequency selective filters of the kind requiring adjustability of filter response characteristic to enable scanning of a frequency band. The signal generators of this invention afford particular advantage in the array radiator application because the control they afford of signal amplitudes allows precise and convenient adjustment of beam width and shape as well as of beam pointing angle. They afford particular advantage also in array radiators in which the beam must be steered in two directions, as in planar arrays, with which they permit significant system simplification and reduction of the number of required components as will be explained hereinafter.

DESCRIPTION OF THE PRIOR ART

A signal generator directed to the same basic purpose as that of the present invention is described in the inventor's earlier patent, U.S. Patent 3,086,172, which issued Apr. 16, 1963. The present invention displays certain commonalities of components and function with the signal generator of the aforementioned patent, but it presents substantial differences over the earlier invention which afford important cost and performance advantages in many of the applications in which generators of this kind find use. These advantages and the differences in circuitry from which they result will become fully apparent as the description of the invention proceeds.

Still more different arrangements for producing signal sets with adjustable phase slope across the set are described in such other patents as No. 3,153,788, which issued Oct. 20, 1964 to Washburne. This and like prior proposals have little if any commonality of circuitry with the signal generator of the present invention, and they differ also in performance capabilities in such respects as convenience and precision of signal amplitude and phase slope adjustment.

SUMMARY OF THE INVENTION

In accordance with the invention, signal sets of the character described may readily be generated with good precision of signal amplitude and phase slope control, and with relative simplicity and economy of circuitry both in the generator itself and in the associated circuitry with which it normally is used in its end applications. In its preferred embodiment the invention comprises reference and steering harmonic spectrum generators each including a pulse generator operative to produce a family of harmonics of its input basic frequency. This basic frequency is the same for both spectrum generators, but their inputs are given an adjustable relative phase differential preferably by connecting the two to a common basic frequency source with one such connection being direct and one routed through an adjustable phase shifter. Each of the harmonics constituting the output spectrum of one generator is translated in frequency with respect to the corresponding harmonic from the other as by mixing the one spectrum with a local oscillator signal to effect a frequency offset of each of its harmonics. Paired signals of like harmonic order in the two spectra then are combined in mixers individual to each harmonic order, the difference signals being selected to yield the desired output signal set. The signals of this set all are of frequency equal to the offset frequency, and of phase angle proportional to the product of the harmonic order of the signals from which each is derived times the phase differential introduced by the adjustable phase shifter. That is, each of the signals in the output set is displaced in phase from the two adjacent signals of the set by a phase difference equal to that introduced by the phase shifter, so the phase progression across the set is linear and of variable slope controllable by adjustment of the phase shifter. For amplitude control, one or both of the pulse generators comprising the harmonic spectrum generators provides variable pulse width, so that the spectral lines constituting the output of that generator differ in amplitude from line to line to introduce a controlled amplitude variation across the output signal set. In this way when the signal generator of the invention is applied to an array radiator for a radar or sonar system the width and shape of the transmitted or received beam formed by the array may conveniently and precisely be controlled.

BRIEF DESCRIPTION OF THE DRAWINGS

The foregoing and other objects, features and advantages of the invention will be more fully understood by reference to the following detailed description when read in conjunction with accompanying drawings, wherein:

FIGURE 2 illustrates the waveform of the summed signal output of the antenna array of FIGURE 1;

FIGURE 3 is a block diagram of the signal generator of the present invention;

FIGURE 4 illustrates the spectral line character of the outputs of the reference and steering harmonic spectrum generators forming parts of the signal generator of FIGURE 3.

DESCRIPTION OF PREFERRED EMBODIMENTS

Figure 1:
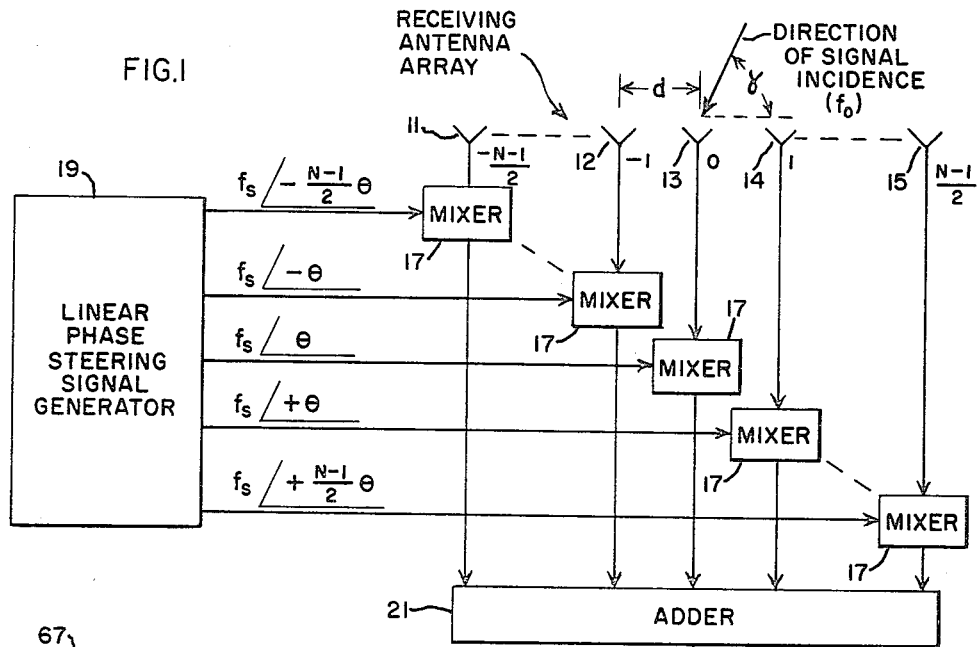
FIGURE 1 is a block diagram of a phase steered receiving antenna array of the kind with which the signal generator of this invention finds application.

With continued reference to the drawings, wherein like reference numerals have been used throughout to designate like elements, FIGURE 1 illustrates a conventional radar receiving antenna array and associated signal processor for electronic beam forming and steering using a linear phase steering generator of the kind to which the present invention relates. As shown, a plurality of dipoles or other receptor elements 11–15 are ordered in a linear array disposed symmetrically about the center receptor element 13 with spacing $d$ between each adjacent pair of elements.

The received signal sensed by each of the receptor elements 11–15 constitutes one input to one of a bank of mixers 17 each having as its second input one of a group of N steering signals all at common frequency $f_s$ and with linearly stepped phase angle, the phase difference between each two adjacent signals being plus or minus $\theta$ as indicated. These steering signals are supplied by a linear phase steering generator 19, and each is heterodyned with one of the received signals (at frequency $f_0$) to produce a family of signals of common frequency ($f_0 \pm f_s$) which are summed in an adder 21 to provide a beam output signal $E_\Sigma$. Such additive summation can occur, however, only for one angle ($\gamma$) between the array face and the direction of signal incidence upon it, this being the angle at which the phase progression of the received signal along the length of the array corresponds to the phase slope of the steering signals.

More precisely, with an incident signal which is of frequency $f_0$ (angular frequency $\omega_0$), which has complex modulation $f(t)$, and which is incident on the array from direction $\gamma$, the $n^{th}$ element signal may with certain simplifying assumptions be written as:

$$E_n = f(t) e^{j(\omega_0 t + nkd\eta)} \qquad (1)$$

where $k = 2\pi/\lambda$ and $\eta = \cos \gamma$.

If the $n^{th}$ mixer introduces a phase change of $-n\theta$ corresponding to a linear set of N phase steps each of width $\theta$ across the array, the output of the adder may be given by:

$$E_\Sigma = f(t) \sum_n e^{j[\omega_0 t + n(kd\eta - \theta)]} \qquad (2)$$

This summation is between the limits $$-\frac{N-1}{2} \text{ to } +\frac{N-1}{2}$$

and yields:

$$E_\Sigma = f(t) e^{j\omega_0 t} \frac{\sin \frac{N}{2}(kd\eta - \theta)}{\sin \frac{1}{2}(kd\eta - \theta)} \qquad (3)$$

This $\sin Nx / \sin x$ pattern function is plotted in FIGURE 2 against cosine $\gamma$, the beam direction cosine. Although the pattern is infinitely repetitive, it only has real meaning for values of cosine $\gamma$ between $\pm 1$, of course. For optimizing the received pattern and reducing its sidelobes, the uniform weighting assumed for the individual elements of the array in the relations just set forth should be replaced by some more refined weighting as by amplitude control of the individual signals being summed, in which case the output becomes:

$$E_\Sigma = f(t) e^{j\omega_0 t} \sum_n T_n e^{jn(kd\eta + \theta)}$$

$$= f(t) e^{j\omega_0 t} T(kd\eta - \theta) \qquad (4)$$

where $T_n$ might be Tchebysheff weights or sample values of a Taylor aperture function and $T(kd\eta - \theta)$ would represent the corresponding real pattern function.

The antenna system concept as just described is reciprocal. Hence if a continuous wave signal at angular frequency $\omega_0$ were impressed at the common point of the adder 21 the far-field radiation pattern would be given by the same $E_\Sigma$ expressions just stated. Such systems, in both receiving and transmitting versions, have found wide application and a variety of signal generating circuits have been proposed for providing the required set of steering signals of common frequency and variable phase slope. The steering signal generator of the present invention provides such steering signal set with relative simplicity and economy of circuitry and with good precision of control of beam pointing direction and beam width, as will be explained.

With reference now to FIGURE 3, a local oscillator 25 operative at some suitable frequency $f_1$ transmits its output directly to a first pulse generator 27 and, through an adjustable phase shifter 29, transmits it also to a second pulse generator 31. These pulse generators may be essentially identical except as hereinafter noted, and are of conventional type operative to produce an output spectrum of harmonics of the input basic frequency, each such harmonic being an integral multiple of the basic frequency $f_1$.

The harmonic spectra produced by pulse generators 27 and 31 are transmitted through comb filters 33 and 35 to mixers 37 and 39, respectively. Comb filters 33 and 35 pass only frequencies corresponding to harmonics of the basic frequency $f_1$, and so pass to each of mixers 37 and 39 a family of spectral lines or harmonics of frequencies $f_1, 2f_1, 3f_1, \ldots Nf_1$. Each of the harmonic signals into mixer 39 is displaced in phase from the corresponding signal of the like harmonic order into mixer 37 by the product of the phase shift ($\theta$) introduced by phase shifter 29 times the numeric order of that harmonic.

A second local oscillator 41 producing an output signal at frequency $f_2$ transmits this signal both as a second input to mixer 37 and as an input to another mixer 43 the other input to which is from a third local oscillator 45 with output frequency $f_s$, which may be termed the steering signal frequency. The $f_1$ harmonics produced by the reference spectrum generator 27, 33 and those produced by the steering spectrum generator 29, 31, 35, combine with the local oscillator frequencies $f_s$ and $f_2$, respectively, in mixers 37 and 39, to yield upper and lower sideband signals corresponding to each harmonic of the two spectra with frequency offset by $f_2$ in mixer 37 and by $f_s + f_2$ in mixer 39, and with the phase relationships between signals within each spectrum preserved unchanged. The upper and lower sideband signals thus generated are transmitted to demultiplexers 47 and 49, respectively, where they are separated by harmonic order, i.e., in accordance with the $f_1$ multiplier. Each demultiplexer then outputs a signal corresponding to each harmonic order to one of a series of mixers 51–55.

The signals supplied to these mixers accordingly are of the frequencies and phase angles indicated, and they combine in the mixers to yield sum and difference signals of frequencies such that the difference signals all are of the steering signal frequency, $f_s$. The narrow band filters and amplifiers 57 in the outputs from the mixers 51–55 pass only the steering frequency $f_s$ and the output signals are therefore all of this same frequency.

The signal inputs to mixers 51–55 from demultiplexer 47 all are at essentially the same phase angle, which may be taken as zero degrees in this example, whereas the signals into mixers 51–55 from the other demultiplexer 49 are at phase angles displaced from each other in accordance with their numeric order in the $f_1$ harmonic frequency spectrum. Thus, for the zero order harmonic the phase angle is 0, for the first order harmonic the phase angle values are plus $\theta$ and minus $\theta$, and for the $$\frac{N-1}{2}$$

order harmonic the corresponding phase angles are plus and minus $$\frac{N-1}{2}\theta$$

While the frequencies $f_1$ and $f_2$ both cancel in mixers 51–55, the phase differentials introduced on the basic frequency $f_1$ are retained in the output as $f_s$, as is shown by the phase angle indications for each of the output signals.

The desired control of beam direction is, as previously noted, obtained by variation of the phase slope across the output signal set, and in the invention as illustrated in FIGURE 3, this phase slope adjustment is introduced by the BEAM STEERING INPUT at 59 to the phase shifter 29, which controls the magnitude of phase shift $\theta$. Since adjustable phase shifters of excellent precision are achievable, accurate and convenient control of the output signal phase slope and thus of beam pointing direction is readily attainable through this arrangement.

For beam width control, one or both of the two pulse generators 27 and 31 may include means for varying the width of the pulse and thus controlling the amplitude distribution of the output harmonic spectrum. This is accomplished as illustrated in FIGURE 4, which shows representative output spectral lines with narrow pulse at A and with wide pulse at B. As is apparent, the spectral lines corresponding to all harmonic orders in the narrow pulse output at A are of substantially constant amplitude whereas those produced by a wide pulse as at B display a substantial amplitude taper or slope as shown. By thus controlling the amplitudes of the harmonic spectral lines the beam width and shape may conveniently be controlled, and at the same time array symmetry is preserved by virtue of the fact that each spectral line is used to generate one output signal of positive phase angle and one of negative, by use of both the upper and lower sidebands in the output of mixers 37 and 39. Thus when the system of FIGURE 3 is adjusted for narrow beam operation the zero order harmonic is of relatively greater amplitude than the $$\frac{N-1}{2}$$

harmonic, but symmetry is preserved because the upper and lower sidebands including this latter harmonic are used to generate two outputs of equal but opposite phase angles.

It will be noted that the filters and amplifiers 57 all are at the same frequency $(f_s)$ and are not themselves directly in the received signal paths. For this reason they do not require wide range either of frequency or of signal amplitude and accordingly may be of relatively simple and inexpensive design. It will be noted also that when the signal generator of FIGURE 3 is embodied in an electronically steerable array as shown in FIGURE 1, each of the elemental signal processing channels need include but a single mixer and any filtering required in these signal processing channels may be identical for all. Also, since each elemental channel needs only the one mixer, the first level steering of a planar array requires many fewer mixers than systems previously proposed incorporating two or more mixers in each signal channel for two-directional steering.

This system also lends itself well to use as a source of linearly phased transmitter excitations of common frequency and variable phase slope for transmitted beam steering. These signals may be taken directly from the filter-amplifiers 57 and coupled to the radiating elements directly without using signal channel mixers. As previously noted the invention has application also to tunable filters of the type described in the above-mentioned patent, 3,086,172, Johnson in which a tapped delay line replaces the antenna array as the input signal source.

Finally it should be noted that depending upon frequency and bandwidth requirements of the particular application, local oscillator 41 and the frequency shift $(f_2)$ it introduces may be omitted altogether. Since this $f_2$ frequency offsets both harmonic spectra equally and cancels completely from the output, it need be provided only in those cases in which it is needed to provide both upper and lower sideband signals for each spectral harmonic, to maintain symmetry of the output signal amplitude slope as previously mentioned. It may of course also be useful in some cases to bring the sum and difference frequencies to be processed in the demultiplexers 47–49 and mixers 51–55 to more convenient operating levels.

Figure 5:
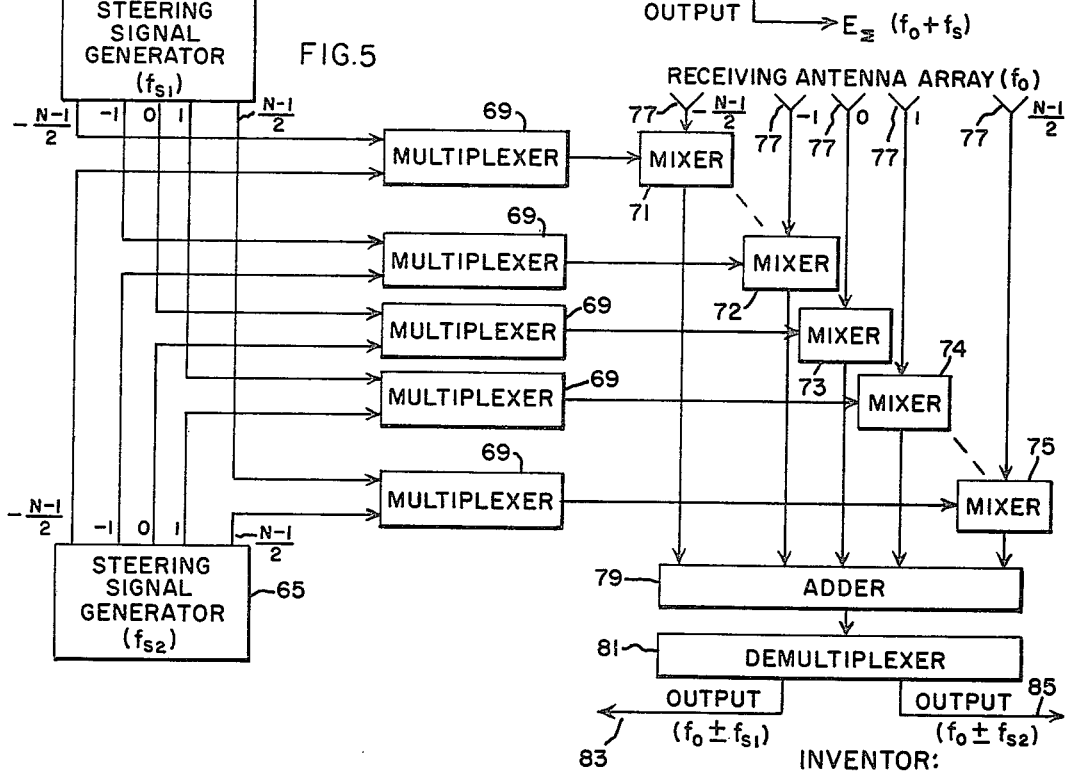
FIGURE 5 is a block diagram of a receiver combining a phase steered antenna array and a plurality of linear phase steering generators in accordance with the invention for providing multiple beam capability with a single array.

In the system as thus far described there is provided a single beam output. It is also possible to produce a number of independently steered beams through use of a corresponding plurality of the steering signal generators of FIGURE 3, connected to a frequency multiplexed arrangement as illustrated in FIGURE 5. As there shown, two steering signal generators 65 and 67 each essentially identical to that of FIGURE 3 provide sets of output signals at frequencies $f_{s1}$ and $f_{s2}$, respectively. Corresponding ones of these output signals are paired and transmitted to multiplexers 69, one such multiplexer being provided for each pair of signals in the output sets. Each pair of signals thus multiplexed is transmitted into one of a like number of mixers 71–75 and there combined with received signals from one of the array radiator elements 77, which elements may be of the same type as previously described in reference to FIGURE 1.

The steering and received signals thus heterodyned are summed in adder 79, and the output then separated by a frequency demultiplexer 81 to yield the two desired beam outputs indicated at 83 and 85. In this way it is possible to provide a number of independently steered beams with only one mixer per array element, i.e., with only one mixer in each received signal processing channel, and with the necessary paralleling of processor elements being accomplished in the steering signal channels instead. This enables substantial reduction of array complexity and at the same time affords optimized precision of beam steering and width control.

While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. A signal generator for producing a set of signals of common frequency and of uniformly stepped phase progression, comprising:
   (a) means for generating a first spectrum of signals of harmonically related frequencies and of phase angles stepped proportionally to the harmonic order of each of the signals;
   (b) means for generating a second signal spectrum including harmonics of the same frequencies as in said first spectrum but with all signals of common phase angle;

(c) common frequency shift means for shifting the frequencies of the signals of one of said spectra by a common amount while preserving unchanged the phase relationships between signals of that spectrum;

(d) means for separating by harmonic order the signals of said spectra; and (e) means for mixing each of the signals of said one spectra thus frequency shifted and separated with the signal of corresponding harmonic order from the other of said spectra to derive a set of output signals all of the frequency introduced by said frequency shift means and each of phase angle proportioned to the harmonic order of that first spectrum signal from which it derived.

2. A signal generator for producing a set of signals of common frequency and of variable phase slope, comprising:

(a) first and second signal sources providing signal output at first and second frequencies, respectively;

(b) a first harmonic spectrum generator connected to said first signal source and responsive thereto to produce a reference harmonic signal spectrum comprising a plurality of signals of harmonically related frequencies and of common phase angle;

(c) phase shifting means adjustable to vary the magnitude of signal phase shift effected thereby;

(d) a second harmonic spectrum generator connected through said phase shifting means to said first signal source and responsive thereto to provide a steering harmonic signal spectrum comprising a plurality of signals of harmonically related frequencies and of phase relation such as to provide between the signals of each two adjacent harmonics a phase difference of magnitude equal to the phase shift effected by said phase shifting means;

(e) first, common mixer means for mixing the signal output of said second signal source with the signals of one of said hormonic spectra to produce a frequency shifted signal corresponding to each harmonic order of that spectrum, said frequency shifted signals having phase relationships unchanged from the signals of said one spectrum but frequencies offset therefrom by said second frequency;

(f) means for separating by harmonic order the signals of said spectra; and (g) second mixer means for mixing each of said frequency shifted signals with the signal of corresponding harmonic order in the other of said harmonic spectra to produce a set of different signals all of said second frequency and of phase slope determined by the adjustment of said phase shifting means.

3. A signal generator as defined in claim 2 further including a third signal source and third mixer means for mixing its signal output with the signals of both of said harmonic spectra to produce upper and lower sideband signals, and wherein said upper and lower sideband signals corresponding to each of a plurality of harmonic orders are combined in said second mixer means to yield two output signals with phase angles of like value but opposite sign.

4. A signal generator as defined in claim 3 wherein each of said spectrum generators comprises a pulse generator with at least one such generator providing adjustable pulse width for control of the relative amplitudes of signals of different harmonic orders in the spectral output of that generator.

5. In combination in a radiant energy receiver including a phase steered receptor array, a receive beam forming and steering system comprising:

(a) a plurality of radiant energy receptor elements arranged in ordered array;

(b) a like plurality of mixer elements each including a received signal input from one of said receptor elements, a steering signal input, and a signal output including at least one sideband of the input signals as mixed thereby;

(c) adder means for combining the mixer outputs to produce a sum signal when the phase progression of received signals at the receptor elements corresponds to the phase progression of said steering signals; and (d) a steering signal source connected to supply to each of said mixer elements one of a set of steering signals of common frequency and of variable linear phase progression across the set, said steering signal source comprising:

(i) first and second signal sources providing signal output at first and second frequencies, respectively;

(ii) a first harmonic spectrum generator connected to said first signal source and responsive thereto to produce a reference harmonic signal spectrum comprising a plurality of signals of harmonically related frequencies and of common phase angle;

(iii) phase shifting means adjustable to vary the magnitude of phase shift effected thereby;

(iv) a second harmonic spectrum generator connected through said phase shifting means to said first signal source and responsive thereto to produce a steering harmonic signal spectrum comprising a plurality of signals of harmonically related frequencies and of phase relation such as to provide between the signals of each two adjacent harmonics a phase difference of magnitude equal to the phase shift effected by said phase shifting means;

(v) common means for mixing the signal output of said second signal source with the signals of one of said harmonic spectra to produce a frequency shift signal corresponding to each harmonic order of that spectrum, said frequency shifted signals having phase relationships unchanged from the signals of said one spectrum but frequencies offset therefrom by said second frequency;

(vi) means for separating by harmonic order the signals of said spectra; and (vii) means for mixing each of said frequency shift signals with the signal of corresponding harmonic order in the other of said harmonic spectra to produce a set of signals all of said second frequency and of phase slope determined by the adjustment of said phase shifting means.

6. A radiant energy receiver as defined in claim 5 wherein each of said spectrum generators comprises a pulse generator with at least one such generator providing variable pulse width for control of the relative amplitudes of signals of different harmonic orders in the spectral output of that generator, and further includes means for adjusting generator pulse width to thereby effect adjustment of receive beam width.

References Cited

UNITED STATES PATENTS

| | | | |
|---|---|---|---|
| 3,086,172 | 4/1963 | Johnson | 328—22 |
| 3,005,960 | 10/1961 | Levenson | 343—100 X |
| 3,182,324 | 5/1965 | Nelson et al. | 343—100 |
| 3,238,528 | 3/1966 | Hines | 343—100 |

RICHARD A. FARLEY, Primary Examiner

U.S. Cl. X.R.

328—21; 340—16; 343—100, 115